United States Patent [19]

Folk et al.

[11] Patent Number: 4,708,012

[45] Date of Patent: Nov. 24, 1987

[54] METHOD AND APPARATUS FOR HIGH PRESSURE TESTING OF SOLID STATE PRESSURE SENSORS

[75] Inventors: Lee E. Folk, Phoenix; Carl E. Derrington, Carson Tempe, both of Ariz.

[73] Assignee: Motorola, Inc., Schaumburg, Ill.

[21] Appl. No.: 897,955

[22] Filed: Aug. 19, 1986

[51] Int. Cl.$^4$ .................................. G01L 27/00
[52] U.S. Cl. .................................. 73/4 R; 73/1 B; 29/595
[58] Field of Search .................. 73/4 R, 1 B; 29/595, 29/593, 705, 738

[56] References Cited

U.S. PATENT DOCUMENTS 3,868,844  3/1975  Klein ................................ 73/4 R
4,331,022  5/1982  Coussot et al. .................... 73/4 R
4,603,574  8/1986  Norman ............................ 73/4 R

FOREIGN PATENT DOCUMENTS 266299  6/1970  U.S.S.R. ........................... 73/4 R
696322  11/1979  U.S.S.R. .......................... 73/4 R

Primary Examiner—Tom Noland
Attorney, Agent, or Firm—Raymond J. Warren

[57] ABSTRACT

A method of testing the diaphragm portion of the die before the pressure sensor is assembled is disclosed. A mechanical pressure is exerted upon the diaphragm equivalent to any desired atmospheric pressure. The electrical output of the die is then measured to determine if it is within an acceptable range. If the electrical output is not within the acceptable range the resistors of the die can be trimmed at that time, prior to assembly.

9 Claims, 5 Drawing Figures

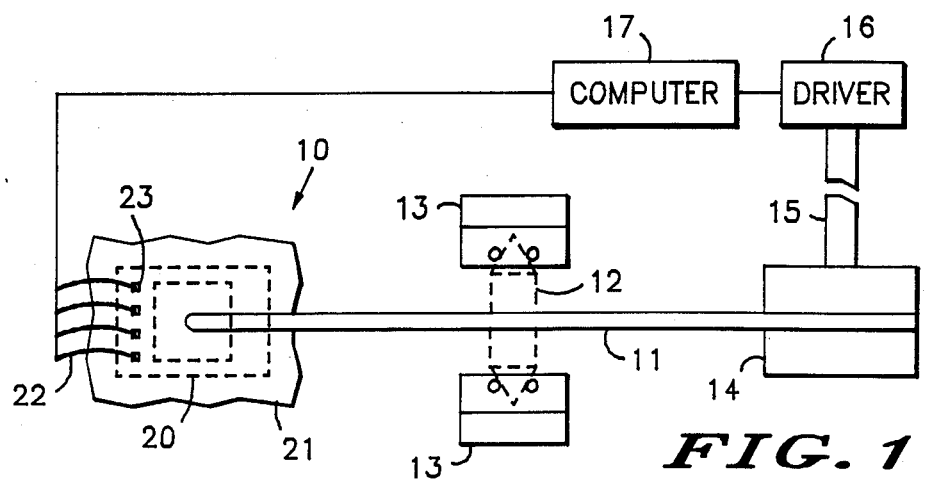
FIG. 1
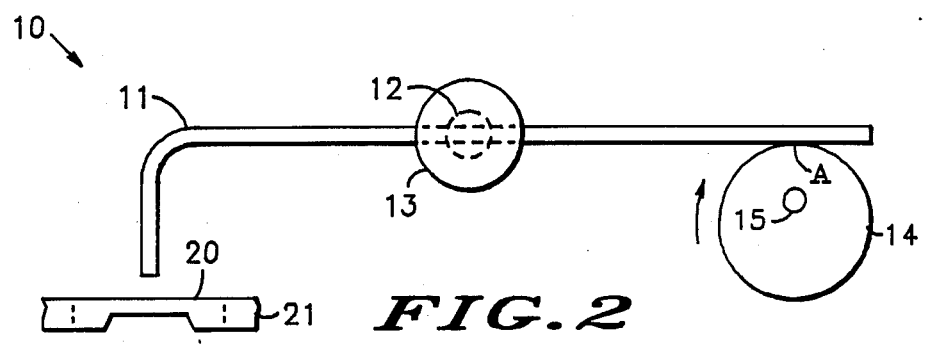
FIG. 2
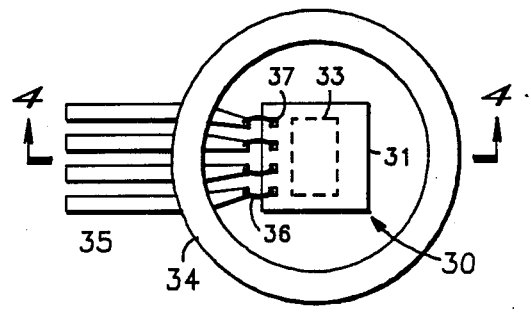
FIG. 3  – PRIOR ART –

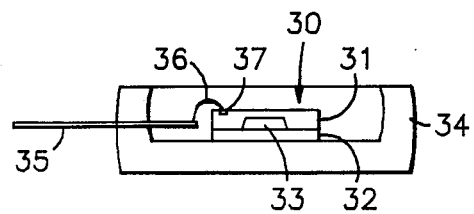
FIG. 4 — PRIOR ART —
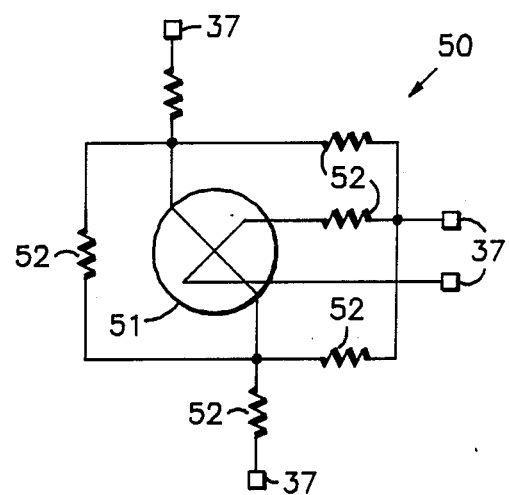
FIG. 5 — PRIOR ART —

METHOD AND APPARATUS FOR HIGH PRESSURE TESTING OF SOLID STATE PRESSURE SENSORS

BACKGROUND OF THE INVENTION

The present invention relates, in general, to a method and apparatus for testing pressure sensors and, more particularly, to a method and apparatus for high pressure testing of solid state pressure sensors.

Solid state pressure sensors are comprised of a diaphragm die (or wafer of dice) being coupled to a base die (or wafer of dice) leaving a cavity disposed therein. As the surrounding pressure changes, the diaphragm flexes causing a change in the electrical properties of the diaphragm. These electrical properties are measured and used to provide a value indicative of the pressure being exerted on the die.

Presently, solid state pressure sensors are tested after final assembly of the devices. This means that the manufacturer has already borne most of the cost of production before a device can be evaluated as to its usefulness.

To test the devices, they are placed in a pressure chamber that also contains the testing equipment. This type of testing device, because of the high pressures at which it operates, can be hazardous. This method of testing devices also takes a great amount of time waiting for the pressure to be raised before the testing and lowered after the testing. This technique requires the use of a large, relatively expensive pressure chamber.

SUMMARY OF THE INVENTION

Accordingly, it is an object of the present invention to provide a method and apparatus for high pressure testing of solid state pressure sensors that will overcome the deficiencies set out above.

Another object of the present invention is to provide a method and apparatus for high pressure testing of solid state pressure sensors that has a faster cycle test time.

Still another object of the present invention is to provide a method and apparatus for high pressure testing of solid state pressure sensors that is safer to operate.

Yet another object of the present invention is to provide a method and apparatus for high pressure testing of solid state pressure sensors that does not require the use of a pressure chamber.

Another object of the present invention is to provide a method and apparatus for high pressure testing of solid state pressure sensors that can test pressure sensors prior to assembly.

The above and other objects and advantages of the present invention are provided by the method and apparatus of high pressure testing a solid state pressure sensor device described in detail below.

A particular embodiment of the present invention comprises a method having the steps of: positioning a diaphragm portion of a die in contact with a probe; exerting a predetermined amount of pressure on the die using the probe and measuring the electrical output of the die. In one preferred embodiment, if the electrical output is not within an acceptible range, then a resistor, or resistors, on the die are trimmed until the electrical output is within the acceptable range.

Another particular embodiment of the present invention comprises an apparatus having: a probe for exerting pressure on a diaphragm portion of a die; a driver for driving the probe; sensing means for sensing the electrical output of the diaphragm portion; and a control means for controlling the pressure exerted upon the diaphragm portion and for reading the electrical output sensed by the sensing means.

BRIEF DESCRIPTION OF THE DRAWINGS

FIG. 1 is a block diagram of a testing apparatus embodying the present invention;

FIG. 2 is a side view of a portion of the testing apparatus of FIG. 1;

FIG. 3 is a top view of a prior art solid state pressure sensor in a package;

FIG. 4 is a cross sectional view of the solid state pressure sensor of FIG. 3; and FIG. 5 is a prior art schematic diagram of a circuit embodicd on the solid state package of FIG. 3.

DETAILED DESCRIPTION OF THE DRAWINGS

One particular embodiment of a high pressure testing apparatus, generally designated 10, embodying the present invention is illustrated in FIGS. 1 and 2. Apparatus 10 consists of a probe 11 being mounted to a bearing 12 which is pivotally coupled to a support 13. Probe 11 is driven by an offset cam 14 which is attached to a drive shaft 15. Drive shaft 15 is preferably coupled to a driver 16 which is preferably controlled by a computer 17.

Driver 16, in one embodiment, may be composed of a motor/driver that is capable of being stepped in small increments, such as the LE 43-34 motor/driver manufactured by Compumotor Corporation that will step at 25,000 steps per revolution. This motor/driver is controlled by an indexer such as the model 2100-1 Preset Indexer also manufactured by the Compumotor Corporation.

Apparatus 10 is utilized to test a die 20 of a wafer 21. It should be noted here that, while it is more economical to test the dice while they are still in wafer form, the die may be separated and tested individually. This test is preferably performed prior to attachment of the base wafer; cutting the dice; attachment of the leads, or packaging of the pressure sensor.

The prior art method of high pressure testing of solid state pressure sensors can be described with reference to FIGS. 3 and 4. FIGS. 3 and 4 show a solid state pressure sensor 30 comprised of a diaphragm wafer 31 being coupled to a base wafer 32 leaving an opening 33. Circuit 30 is shown mounted in a package 34 being coupled to a set of leads 35 by bonding wires 36 coupled to bonding pads 37.

To test this device, it was placed in a pressure chamber and subjected to a high pressure, on the order of 100 psi. The voltage across leads 35 was then measured to determine if pressure sensor 30 is calibrated accurately. If the voltage was high or low, resistors incorporated in the die of pressure sensor 30 were trimmed until the voltage was within the range for that pressure.

FIG. 5 illustrates a basic schematic diagram, generally designated 5, of a pressure sensor. A pressure sensor 51 is shown having various leads coupled to bonding pads 35. Between the leads of sensor 51 and pads 37 are a plurality of resistors 52. By trimming resistors 52, the voltage across pads 37 can be increased or decreased. Occasionally, a pressure sensor 30 was found that was unable to be calibrated because the amount of error was too large for accurate calibration. These packaged sensors were then marked as rejected and discarded.

Once the tests were completed, the pressure chamber was depressurized and the device removed. This took a great deal of time to cycle through one testing run and requires a large testing chamber that would incorporate the testing equipment.

The present invention operates by first calibrating apparatus 10 using a reference. The reference used would be a load cell, or the like, such as the ELF-500 manufactured by Entran Devices, Inc. To calibrate apparatus 10, cam 14 is rotated until position A is contacting probe 11. The load cell is then placed under the head of probe 11 and cam 14 is rotated in increments by driver 16 until the load cell indicates to computer 17 that contact has been made. Cam 14 is then rotated in increments until the load cell indicates that a force equivalent to 100 psi is being exerted upon it by probe 11. The number of increments to produce this pressure is recorded in computer 17.

Once apparatus 10 has been calibrated, it is used to test individual die of a wafer. As shown in FIG. 2, cam 14 will be positioned such that point A is in contact with probe 11. The die to be tested is then disposed below probe 11 and various contacts 22 are coupled to contact areas 23, such as bonding pads 37 of FIGS. 3-5, of the die. Cam 14 is then rotated in increments causing probe 11 to be lowered toward wafer 21. When contact is made with die 20 this is sensed by computer 17 from the output of die 20. Computer 17 will continue to operate driver 16 until the number of increments has been completed that provided a force representing 100 psi on the load cell.

At this point, measurements are taken from the die contacts to see if the voltage across the contacts represents the correct amount for 100 psi. If the voltage difference is incorrect, a laser will then trim the various resistors on die 20 to provide the correct reading.

This method eliminates the need of using a pressure chamber and saves a great deal of time in testing that was used waiting for the pressurization and depressurization of the pressure chamber.

In addition, if a bad die is detected, one that cannot be calibrated, the die can be rejected immediately. Since the die is tested prior to assembly, time and money are saved by discarding the device at an early stage.

Further, by testing the die in this fashion, more accurate adjustments may be made since areas can be probed on the die that are not available once the die is packaged. As an example, it is desirable to be able to test areas such as nodes 53 and 54 of the device, shown in FIG. 5, in order to measure temperature effects, or the like, on the die.

Thus, it will be apparent to one skilled in the art that there has been provided in accordance with the invention, a method and apparatus that fully satisfies the objects, aims and advantages set forth above.

While the invention has been described in conjunction with specific embodiments thereof, it is evident that many alterations, modifications and variations will be apparent to those skilled in the art in light of the foregoing description. Accordingly, it is intended to embrace all such alterations, modifications and variations in the appended claims.

We claim:

1. A method of performing a high pressure test on a solid state pressure sensor comprising the steps of:
   positioning a die in a high pressure tester;
   positioning a probe of said high pressure tester in contact with a surface of said die;
   exerting a force on said die using said probe;
   measuring an electrical output of said die; and
   adjusting a resistance of said die if said measured electrical output is not within a preselected range.

2. The method of claim 1 further comprising the following steps preceding the step of positioning a die in a high pressure tester:
   positioning a reference cell in said high pressure tester;
   positioning said probe in contact with a surface of said reference cell;
   exerting force on said reference cell with said probe until a predetermined pressure is indicated by said reference cell;
   measuring the amount of said force being exerted by said probe on said reference cell; and
   storing said amount of said force measured as said predetermined amount of pressure.

3. The method of claim 1 wherein said step of adjusting a resistance of said die if said measured output is not within a preselected range consists of laser trimming a resistor of said die.

4. A method of producing a solid state pressure sensor comprising the steps of:
   fabricating a diaphragm die;
   performing a high pressure test on said diaphragm die;
   coupling a base die to said diaphragm die; and
   mounting said diaphragm and base dice in a package.

5. The method of claim 4 wherein said step of performing a high pressure test on said diaphragm die comprises the steps of:
   positioning said die in said high pressure tester;
   positioning a probe of said high pressure tester in contact with a surface of said die;
   positioning said probe to exert a predetermined amount of force on said die;
   measuring an electrical output of said die; and
   adjusting a resistance of said die if said measured electrical output is not within a preselected range.

6. The method of claim 5 further comprising the following steps preceding the step of positioning a die in a high pressure tester:
   positioning a reference cell in said high pressure tester;
   positioning said probe in contact with a surface of said reference cell;
   exerting force on said reference cell until a predetermined pressure is indicated by said reference cell;
   measuring the amount of said force being exerted by said probe on said reference cell; and
   storing said amount of said force measured as said predetermined amount of pressure.

7. An apparatus for performing a high pressure test upon a solid state pressure sensor comprising:
   probe means for applying a force on a diaphragm portion of said solid state pressure sensor
   a driver being coupled to said probe;
   sensing means for sensing an electrical output of said diaphragm portion, said sensing means being coupled to said diaphragm portion; and
   control means for controlling the force exerted on said diaphragm by said probe and coupled to said sensing means for receiving said electrical output of said diaphragm portion.

8. The apparatus of claim 7 further comprising an adjusting means for adjusting an electrical property of said diaphragm portion such that said electrical output is within a predetermined range.

9. The apparatus of claim 7 further comprising a calibration means for setting the amount of said force said probe exerts upon said diaphragm portion.

* * * * *